United States Patent [19]

Liang et al.

[11] Patent Number: 5,791,422
[45] Date of Patent: Aug. 11, 1998

[54] ROCK BIT WITH HARDFACING MATERIAL INCORPORATING SPHERICAL CAST CARBIDE PARTICLES

[75] Inventors: Dah-Ben Liang, The Woodlands; Alysia C. White, Kingwood; Zhigang Fang; Jiinjen Albert Sue, both of The Woodlands, all of Tex.

[73] Assignee: Smith International, Inc., Houston, Tex.

[21] Appl. No.: 815,745

[22] Filed: Mar. 12, 1997

Related U.S. Application Data

[60] Provisional application No. 60/014,225, Mar. 27, 1996, and provisional application No. 60/014,731, Mar. 12, 1996.

[51] Int. Cl.$^6$ ................................................ E21B 10/00
[52] U.S. Cl. ........................ 175/374; 175/425; 428/539.5
[58] Field of Search ................................. 175/331, 374, 175/432, 425; 428/539.5

[56] References Cited

U.S. PATENT DOCUMENTS

| | | | |
|---|---|---|---|
| 3,800,891 | 4/1974 | White et al. | 175/374 |
| 4,673,044 | 6/1987 | Bigelow et al. | 175/339 X |
| 4,699,848 | 10/1987 | Maybon | 428/560 |
| 4,723,996 | 2/1988 | Brunet et al. | 75/10.14 |
| 4,836,307 | 6/1989 | Keshavan et al. | 175/374 |
| 4,944,774 | 7/1990 | Keshavan et al. | 51/309 |
| 5,089,182 | 2/1992 | Findeisen et al. | 264/8 |
| 5,492,186 | 2/1996 | Overstreet et al. | 175/374 |

FOREIGN PATENT DOCUMENTS 2295157  5/1996  United Kingdom.

*Primary Examiner*—Roger J. Schoeppel
*Attorney, Agent, or Firm*—Christie, Parker & Hale, LLP

[57] ABSTRACT

An improved hardfacing for teeth and other surfaces of milled tooth rock bits includes steel in the range of from 20 to 50 percent by weight, and filler in the range of from 50 to 80 percent by weight. The filler includes spherical cast tungsten carbide particles alone or in a mixture of other tungsten carbide particles such as crushed cast spherical or crushed cemented tungsten carbide, macrocrystalline tungsten carbide, or the like. The single crystal monotungsten tungsten carbide particles have a particle size in the range of from 16 to 40 mesh and/or in the range of from 80 to 200 mesh.

27 Claims, 1 Drawing Sheet

ROCK BIT WITH HARDFACING MATERIAL INCORPORATING SPHERICAL CAST CARBIDE PARTICLES

CROSS-REFERENCE TO RELATED APPLICATIONS

This application claims the benefit of provisional patent applications Ser. Nos. 60/014,731, filed Mar. 12, 1996, and 60/014,225, filed Mar. 27, 1996.

FIELD OF THE INVENTION

This invention relates to improved fracture- and wear-resistant hardfacing compositions applied to wear surfaces on teeth on bits for drilling oil wells or the like.

BACKGROUND OF THE INVENTION

Bits for drilling oil wells and the like commonly have a steel body which is connected at the bottom of a drill string. Steel cutter cones are mounted on the body for rotation and engagement with the bottom of a hole being drilled to crush, gouge, and scrape rock for drilling the well. One important type of rock bit referred to as a milled tooth bit has roughly triangular teeth protruding from the surface of the cone for engaging the rock. The principal faces of such a milled tooth that engage the rock are usually dressed with a layer of hardfacing material to resist wear. The specific tooth geometry forms no part of this invention.

Conventional hardfacing usually comprises particles of tungsten carbide bonded to the steel teeth by a metal alloy. In effect, the carbide particles are embedded in a matrix of metal forming a layer on the surface. Most hardfacing on rock bits employs steel alloys containing nickel and cobalt as the matrix, although other alloys may also be used.

It is quite common in referring to the particulate material in the hardfacing merely as "carbide" without characterizing it as tungsten carbide. The metal carbide principally used in hardfacing is tungsten carbide. Small amounts of tantalum carbide and titanium carbide may be present, although considered to be deleterious. It will be understood that as used herein, reference merely to "carbide" means tungsten carbide.

Three types of tungsten carbide have been employed for hardfacing. Possibly the most common is crushed cast carbide. Tungsten forms two carbides, WC and $W_2C$ and there can be an essentially continuous range of compositions therebetween. Cast carbide is typically a eutectic mixture of the WC and $W_2C$ compounds, and as such is substoichiometric, that is, it has less carbon than the more desirable WC form. Cast carbide is solidified from the molten state and comminuted to the desired particle size.

Another type of tungsten carbide is so-called macrocrystalline tungsten carbide. This material is essentially stoichiometric WC in the form of single crystals. Most of the macrocrystalline tungsten carbide is in the form of single crystals but some bicrystals of WC may form in larger particles.

The third type of tungsten carbide used in hardfacing comprises cemented tungsten carbide, sometimes referred to as sintered tungsten carbide. Cemented tungsten carbide comprises small particles of tungsten carbide (e.g., 1 to 15 microns) bonded together with cobalt. Cemented tungsten carbide is made by mixing tungsten carbide and cobalt powders, pressing the mixed powders to form a green compact, and "sintering" the composite at temperatures near the melting point of cobalt. The resulting dense cemented carbide can then be comminuted to form particles of cemented tungsten carbide for use in hardfacing.

A typical technique for applying hardfacing to the teeth on a rock bit is by oxyacetylene welding. A welding "rod" or stick is formed of a tube of mild steel sheet enclosing a filler which is primarily carbide particles. The filler may also include deoxidizer for the steel, flux, and a resin binder to retain the particles in the tube during welding. The hardfacing is applied by melting the rod on the face of the tooth. The steel tube melts to weld to the steel tooth and provides the matrix for the carbide particles in the hardfacing. The deoxidizer alloys with the mild steel of the tube.

Although mild steel sheet is used when forming the tubes, the steel in the hardfacing as applied to a rock bit is a hard, wear resistant, alloy steel. This occurs by the dissolution of tungsten, carbon, and possibly cobalt, into the alloy steel from the tungsten carbide during welding. There may also be some mixing with the alloy steel from the teeth on the cone.

It is important to provide as much wear resistance as possible on the teeth of a rock bit cutter cone. The effective life of the cone is enhanced as wear and fracture resistance of the hardfacing is increased. It is desirable to keep the teeth protruding as far as possible from the body of the cone since the rate of penetration of the bit into the rock formation is enhanced by longer teeth (however, unlimited length is infeasible since teeth may break if too long for a given rock formation). As wear occurs on the teeth, they get shorter and the drill bit may be replaced when the rate of penetration decreases to an unacceptable level. It is desirable to minimize wear so that the footage drilled by each bit is maximized. This not only decreases direct cost, but also decreases the frequency of having to "round trip" a drill string to replace a worn bit with a new one.

U.S. Pat. No. 4,944,774 discloses a hardfacing material for use with the teeth of rock bits that comprises a mixture of crushed cemented tungsten carbide having a particle size in the range of from 20–30 mesh, and macrocrystalline tungsten carbide having a particle size in the range of from 40–80 mesh. Such a hardfacing material is known to provide a good degree of wear resistance and abrasion protection of the inner teeth, and somewhat improved wear resistance of the gage surfaces of the cone and gage row of teeth.

Advances in wear resistance of hardfacing on the teeth and gage surfaces of the cone are desirable to increase the duration during which a hole diameter can be maintained, to enhance the footage a drill bit can drill before becoming dull, and to enhance the rate of penetration of such drill bits. Such improvements translate directly into reduction of drilling expense.

BRIEF SUMMARY OF THE INVENTION

There is, therefore, provided in practice of this invention according to a presently preferred embodiment, a hardfacing material for both an inner row of rock bit teeth, and gage surfaces of a rock bit cone and gage row of rock bit teeth. The hardfacing material includes spherical cast carbide particles alone or in a mixture including other carbide particles such as spherical or crushed cemented carbide, macrocrystalline carbide, carburized carbide, or the like. The carbide particles are in a matrix of alloy steel welded to the steel of the teeth of the cutter cone.

BRIEF DESCRIPTION OF THE DRAWINGS

These and other features and advantages of the present invention will be appreciated as the same becomes better

Figure 1:
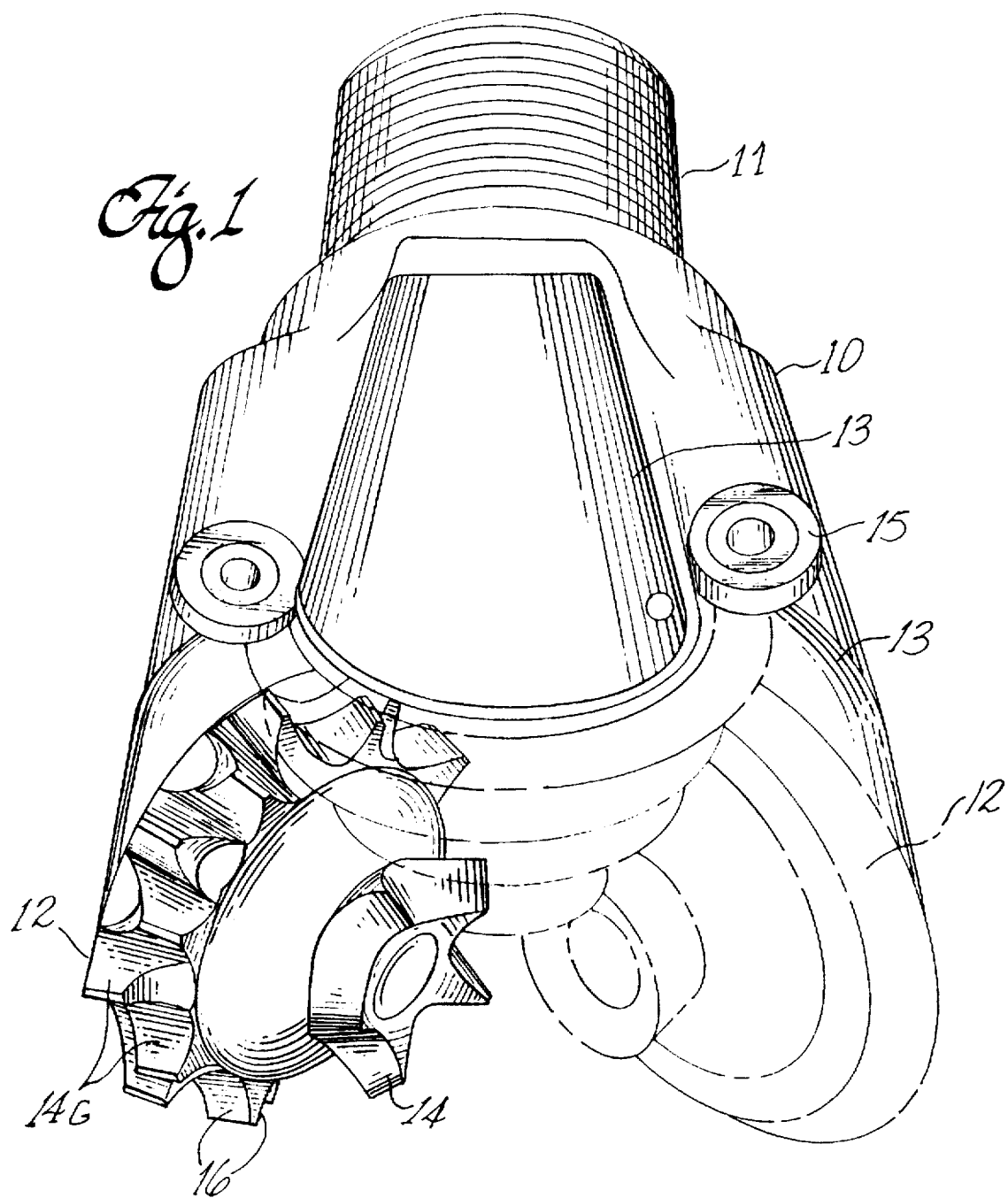
Figure 2:
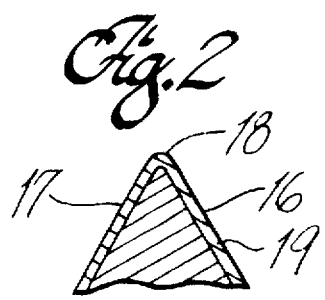

3 understood by reference to the following detailed description when considered in connection with the accompanying drawings wherein:

FIG. 1 is a perspective view of a milled tooth rock bit constructed according to principles of this invention; and FIG. 2 is a fragmentary cross section of an exemplary tooth on such a rock bit.

DETAILED DESCRIPTION

An exemplary milled tooth rock bit comprises a stout steel body 10 having a threaded pin 11 at one end for connection to a conventional drill string. At the opposite end of the body there are three cutter cones 12 for drilling rock for forming an oil well or the like. Each of the cutter cones is rotatably mounted on a pin (hidden) extending diagonally inwardly on one of the three legs 13 extending downwardly from the body of the rock bit. As the rock bit is rotated by the drill string to which it is attached, the cutter cones effectively roll on the bottom of the hole being drilled. The cones are shaped and mounted so that as they roll, teeth 14 on the cones gouge, chip, crush, abrade, and/or erode the rock at the bottom of the hole. The teeth 14G in the row around the heel of the cone are referred to as the gage row teeth. They engage the bottom of the hole being drilled near its perimeter on "gage." Fluid nozzles 15 direct drilling mud into the hole to carry away the particles of rock created by the drilling.

Such a rock bit is conventional and merely typical of various arrangements that may be employed in a rock bit. For example, most rock bits are of the three cone variety illustrated. However, one, two and four cone bits are also known. The arrangement of teeth on the cones is just one of many possible variations. In fact, it is typical that the teeth on the three cones on a rock bit differ from each other so that different portions of the bottom of the hole are engaged by the three cutter cones so that collectively the entire bottom of the hole is drilled. A broad variety of tooth and cone geometries are known and do not form a specific part of this invention.

Exemplary teeth on such a cone are generally triangular in a cross-section taken in a radial plane of the cone. Such a tooth has a leading flank 16 and trailing flank 17 meeting in an elongated crest 18. The flanks of the teeth are covered with a hardfacing layer 19. Sometimes only the leading face of each tooth is covered with a hardfacing layer so that differential erosion between the wear-resistant hardfacing on the front flank of a tooth and the less wear-resistant steel on the trailing face of the tooth tends to keep the crest of the tooth relatively sharp for enhanced penetration of the rock being drilled.

The leading face of the tooth is the face that tends to bear against the undrilled rock as the rock bit is rotated in the hole. Because of the various cone angles of teeth on a cutter cone relative to the angle of the pin on which the cone is mounted, the leading flank on the teeth in one row on the same cone may face in the direction of rotation of the bit, whereas the leading flank on teeth in another row may on the same cone face away from the direction of rotation of the bit. In other cases, particularly near the axis of the bit, neither flank can be uniformly regarded as the leading flank and both flanks may be provided with a hardfacing.

There are also times when the ends of a tooth, that is, the portions facing in more or less an axial direction on the cone, are also provided with a layer of hardfacing. This is particularly true on the so-called gage surface of the bit which is virtually always provided with a hardfacing. The gage surface is a generally conical surface at the heel of a cone

4 which engages the side wall of a hole as the bit is used. The gage surface includes the outer end of teeth 14G in the so-called gage row of teeth nearest the heel of the cone and may include additional area nearer the axis of the cone than the root between the teeth. The gage surface is not considered to include the leading and trailing flanks of the gage row teeth. The gage surface encounters the side wall of the hole in a complex scraping motion which induces wear of the gage surface. In some embodiments, hardfacing may also be applied on the shirttail 20 at the bottom of each leg on the bit body.

Such structure of a milled tooth rock bit is well known and does not form a specific portion of this invention, which relates to the specific hardfacing material employed on the teeth of a milled tooth cutter cone.

Thus, in practice of this invention, the hardfacing material comprises spherical cast carbide particles alone or in a mixture of other carbide particles such as spherical or crushed cemented carbide, single crystal monotungsten carbide, carburized carbide, or the like. The carbide particles are in a matrix of alloy steel welded to the alloy steel of the teeth of the cutter cone.

Cast tungsten carbide has approximately the eutectic composition between bitungsten carbide, $W_2C$, and monotungsten carbide, WC. The cast carbide is typically made by resistance heating tungsten in contact with carbon in a graphite crucible having a hole through which the resultant eutectic mixture drips. The liquid is quenched in a bath of oil and is subsequently comminuted to a desired particle size. The crushed eutectic is what is known as cast carbide.

As used herein, cemented tungsten carbide refers to a material formed by mixing particles of tungsten carbide and particles of cobalt or other iron group metal, and sintering the mixture. In a typical process for making cemented tungsten carbide, small tungsten carbide particles, e.g., 1–15 microns, and cobalt particles are vigorously mixed with a small amount of organic wax which serves as a temporary binder. An organic solvent may be used to promote uniform mixing. The mixture may be prepared for sintering by either of two techniques: it may be pressed into solid bodies often referred to as green compacts; alternatively, it may be formed into granules or pellets such as by pressing through a screen, or tumbling and then screened to obtain more or less uniform pellet size.

Such green compacts or pellets are then heated in a vacuum furnace for first evaporating the wax and then to a temperature near the melting point of cobalt (or the like) which causes the tungsten carbide particles to be bonded together by the metallic phase. After sintering, the compacts are crushed and screened to a desired particle size. The crushed cemented carbide is generally much more angular than the pellets which tend to be rounded. The sintered pellets tend to bond together during sintering and are crushed to break them apart. These are also screened to obtain a desired particle size. Cemented tungsten carbide from such compacts may be made specifically for use in hardfacing, may be manufacturing scrap from making other products, or may be scrap from worn out tungsten carbide products crushed and screened for this purpose.

Yet another type of tungsten carbide is so-called macrocrystalline carbide. This material is essentially stoichiometric WC in the form of single crystals. Most of the macrocrystalline tungsten carbide is in the form of single crystals but some bicrystals of WC may form in larger particles.

The shape of the carbide particles has been found to affect their toughness. Both cemented carbide and cast carbide may be formed into spherical particles. Spherical particles of these carbides have been found to be tougher than crushed particles of cemented, cast, or macrocrystalline carbide. Such spherical particles lack the sharp edges found in crushed particles, which act as stress concentrators and are likely microcrack initiation sites.

Spherical cast carbide particles have been found to be very tough and hard, testing up to 3000 Hardness Vickers. Processes for producing spherical cast carbide particles are described in U.S. Pat. Nos. 4,723,996 and 5,089,182, which are herein incorporated by reference. Basically, a mixture of tungsten and carbon is heated above its melting point into a constantly flowing stream which is poured onto a rotating cooling surface, typically a water-cooled casting cone, pipe, or concave turntable. The molten stream is rapidly cooled on the rotating surface and forms spherical particles of eutectic tungsten carbide.

Hardfacing is applied to the teeth and gage surface by welding with a "rod" in the form of a mild steel tube containing either the particles of cemented tungsten carbide, single crystal WC, or cast carbide to be applied as a hardfacing. However, it is to be understood within the scope of this invention that methods other than that specifically described can be used to apply the hardfacing material of this invention.

Carbide particles are often measured in a range of mesh sizes, for example 40 to 80 mesh. The term "mesh" actual refers to the size of the wire mesh used to screen the carbide particles. For example, "40 mesh" indicates a wire mesh screen with forty holes per linear inch, where the holes are defined by the crisscrossing strands of wire in the mesh. The hole size is determined by the number of meshes per inch and the wire size. The mesh sizes referred to herein are standard U.S. mesh sizes. A standard 40 mesh screen has holes such that only particles having a dimension less than 420 µm can pass. Particles having a size larger than 420 µm are retained on a 40 mesh screen and particles smaller than 420 µm pass through the screen. Therefore, the range of sizes of the carbide particles in a filler is defined by the largest and smallest grade of mesh used to screen the particles. An exemplary filler comprising carbide particles in the range of from 16 to 40 mesh will only contain particles larger than 420 µm and smaller than 1190 µm, whereas another filler comprising particles in the range of from 40 to 80 mesh will only contain particles larger than 180 µm and smaller than 420 µm. Hence, there is no overlap in terms of particle size between these two ranges.

In addition to the carbide in the filler in the tube, it is desirable to include up to five percent by weight of deoxidizer and a temporary resin binder. A suitable deoxidizer is silicomanganese obtained from Chemalloy in Pennsylvania. The nominal composition of the silicomanganese is 65% to 68% manganese, 15% to 18% silicon, a maximum of 2% carbon, a maximum of 0.05% sulfur, a maximum of 0.35% phosphorus, and a balance of iron. Preferably about four percent deoxidizer is used. A small amount of thermoset resin is desirable for partially holding the particles together in the tube so that they do not simply fall out during welding. A half percent by weight of resin is adequate.

The proportion of filler to the weight of the steel tube within which it is enclosed in an exemplary embodiment is 50% to 80% filler and 20% to 50% tube. A presently preferred proportion is in the range of 65% to 75% filler and 25% to 35% tube. These proportions can vary by plus or minus 2%. In order to obtain a weight ratio of filler to steel of 70:30, a 5/32 inch (4 mm) diameter tube is made with steel having a wall thickness of 0.017 inch (0.43 mm). Roughly the same proportions are obtained in a 3/16 inch (4.5 mm) diameter steel tube by making it with a wall 0.02 inch (0.5 mm) thick.

According to a presently preferred embodiment, the tungsten carbide portion of the filler comprises spherical cast tungsten carbide in the range of from 10 to 100 percent by weight, with the remainder consisting of the other types of tungsten carbide particles described above. The spherical tungsten carbide particles are in the preferred size ranges of between 16 to 40 mesh and/or between 80 to 200 mesh, however 100 to 200 mesh is preferred in this finer particle size range. For example, a typical filler composition can be made up using 30 kg of 16 to 30 mesh spherical cast tungsten carbide, 40 kg of 16 to 30 mesh crushed cemented tungsten carbide, 25 kg of 40 to 80 mesh macrocrystalline carbide, 4 kg of silico-manganese deoxidizer, and 0.5 kg of phenolic resin binder. The particles are coated with the resin suspended in an alcohol solution which is then dried. After the tubes are loaded with the filler and the ends crimped, the ends are dipped in a solution of phenolic resin in alcohol to add some binder at the ends. The binder is then heat cured to temporarily bind the particles together.

It has been found that the metal matrix may be strengthened by uniformly dispersing ultra-fine carbide particles in the steel matrix without sacrificing toughness. The ultra-fine particles may be a carbide, such as chromium, vanadium or niobium carbide, or a boride such as chromium boride. As used herein, the term "ultra-fine" is defined with respect to the particle size of distinct carbide particles incorporated in the metal matrix as practiced in the prior art, as opposed to carbide particles incorporated in larger carbide particles, such as in cemented tungsten carbide particles as described above. The hypothesized mechanism for this strengthening is dispersion strengthening of the steel matrix. As a result, the wear resistance of the steel matrix is increased and the overall chipping resistance is markedly improved. The ultra-fine carbide particles to be dispersed is the steel matrix according to alternate preferred embodiments of the present invention may be either macrocrystalline tungsten carbide particles, which are crushed and may then be milled for very fine sizes, e.g., below 10 µm, or the ultra-fine particles may be formed by a process in which very small tungsten particles, e.g., 1–50 µm, are carburized to produce a type of tungsten carbide powder generally referred to as carburized carbide. The shape of the ultra-fine carbide particles may be angular or spherical as spherical cast tungsten carbide particles in this preferred size range may also be used for the ultra-fine particles. In a presently preferred embodiment, the ultra-fine particles are included in the hardfacing as a carburized carbide powder containing tungsten carbide particles in the range of from about 15 to 50 µm. A suitable powder containing ultra-fine carbide particles is available from H.C. Stark as MAS-3000 powder. The ultra-fine carbide particles may be introduced directly into the matrix by mixing them with the other carbide particles in the tube rod to be welded. Alternatively, the ultra-fine particles may be uniformly distributed in the matrix by sufficiently overheating the tube rod during welding to induce dispersion of the ultra-fine particles which comprise the cemented carbide particles, causing them to migrate through the matrix by convection.

Presently preferred alternate ratios are provided in the following table:

| Example | Spherical Cemented Carbide (wt %) 28-35 mesh | Spherical Cemented Carbide (wt %) 48-200 mesh | Spherical Cast Carbide (wt %) 100-200 mesh | Ultra-fine Carbide (wt %) 30 μm | Wt % of the filled-in tube rod |
| --- | --- | --- | --- | --- | --- |
| 1 | 70 | — | 20 | 10 | 64 |
| 2 | — | 35 | 45 | 20 | 64 |
| 3 | 40 | — | 50 | 10 | 70 |

The weight percent of the filled-in tube rod in the above chart may include up to 4% fluxing agent and deoxidizer.

The hardfacing material is applied to the faces of a tooth by heating the face to a welding temperature by an oxyacetylene or atomic hydrogen torch. When a suitable temperature is reached, the above-described tubular welding "rod" is melted onto the face of the tooth. In an exemplary embodiment, the thickness of the hardfacing layer is about 1/16 to 3/32 inch (1.6 to 2.4 mm) Dissolution of the silico-manganese in the mild steel of the tube, possible dissolution of some of the tungsten, carbon, and cobalt of the carbides, and mixing of metal from the body of the cutter cone results in an alloy steel matrix for the carbide particles. Microscopic examination after the cutter cone is carburized, quenched, and tempered indicates a Martensitic phase transformation in the alloy steel matrix of the hardfacing.

During drilling, microcracks frequently initiate in the region of the weld joint, in particular at sharp corners which are high stress regions. The welding sequence is a critical parameter for reducing the formation of microcracks in the hardfacing. The critical surfaces, i.e., those surfaces which experience high compressive stresses during drilling, should be hard faced first, followed by less critical surfaces. Furthermore, the edge of the weld joint of hardfacing should be formed at a low stress region to reduce microcracking. Accordingly, the preferred welding sequence of a drilling tooth is the following: crest and leading flank; trailing flank; and side faces of the tooth. In addition, the weld deposits on a given surface of the tooth should be rolled over the corner to the adjacent surface by at least 1/8 inch (3 mm) so that the weld joint is located in the low stress region rather than a sharp edge.

It is hypothesized that the presence of eta phase and oxide particles in the matrix formed as a by-product of the welding process reduces the toughness of the matrix. Eta phase and oxide particles form in the steel matrix during welding due to the presence of excessive oxygen in the torch flame. The eta phase particles, e.g., $W_3Fe_3C$ and $W_3Co_3C$, are the result of carbon depletion of the tungsten carbide as it reacts with the metals in the matrix. Oxide particles form when the metal alloy in the tube rod reacts with the carbide particles and the oxygen in the oxyacetylene torch flame or from the air surrounding the flame. The eta phase and oxides are brittle compounds. Thus a matrix containing a large portion of eta phase and oxide particles tends to be brittle and more prone to fracture. It has been found that the formation of eta phase and oxide particles in the steel matrix can be minimized by controlling the welding parameters when applying the hardfacing.

An oxyacetylene torch flame has inner, intermediate and outer flame cones. Combustion of acetylene occurs in two stages. The first stage:

$$2C_2H_2 + 2O_2 \rightarrow 4CO + 2H_2$$

uses the oxygen and acetylene supplied from the cylinder. The oxygen-acetylene mixture is achieved and controlled in the torch. This reaction can be seen as the small inner cone of the flame. The highest temperature is at the point of this cone. The second stage:

$$4CO + 2H_2 + 3O_2 \rightarrow 4CO_2 + 2H_2O$$

uses oxygen supplied from the air surrounding the flame. This combustion zone constitutes the outer blue envelope of the flame. Intermediate between the inner and outer cones there is a non-luminous intermediate cone. When the acetylene/oxygen ratio is about 1 to 1 and there is neither excess oxygen nor acetylene at the tip of the inner cone, the intermediate cone of the flame is regarded as neutral, i.e. neither oxidizing nor carburizing. A short pale green "feather" at the tip of the inner cone is an indication of an excess of acetylene. When the feather is less than about half the length of the inner cone, the flame is regarded as reducing. A longer intermediate flame is considered carburizing.

A neutral flame showing only three cones without a feather or only a very short feather less than about 1/8 the length of the inner cone is preferred for welding hardfacing on the teeth of a rock bit cutter cone. The oxygen concentration within the intermediate cone in a neutral flame is quite low and oxides should not be formed when the molten metal is within the outer cone and outside the inner cone. A torch configuration to yield a pointed inner cone is preferred over a configuration that yields a bulbous cone.

Previously, when welding the hardfacing material onto a rock bit, the ratio of lengths of the inner and intermediate flame cones is typically maintained at about 3:1, with the end of the tube rod maintained in a region between the tips of these two flame cones, most likely near the tip of the inner cone since that is the location of the highest temperatures. Welders prefer to hold the tip of the inner cone near the workpiece since welding is faster. A flame ratio of about 3:1 is specified in welding handbooks.

According to a presently preferred method for welding hardfacing onto the teeth of a cutter cone, the inner to intermediate flame cone length ratio is maintained at about 4:1 and the tube rod is maintained in a preferred region of the intermediate flame cone away from the tip of the inner cone between about 1-1/2 and 3 times the length of the inner cone. Hardfacing is welded onto rock bit cones using various torch tip sizes. For example, Victor welding torches, manufactured by the Thermadyne Company, have a number 6 and a number 7 size torch tip with orifice diameters of 0.27 cm and 0.32 cm, respectively. With a number 7 tip the typical length of the inner cone is about 2 to 2.5 centimeters. With a number 6 or 7 tip, it is preferred to hold the tube rod in the range of from about 1 to 4 centimeters from the tip of the inner cone. If anything, this region of the flame is neutral or slightly carbon-rich and produces carbon-reduction of the metal alloy being welded by providing excess carbon for the chemical reactions between the metal and cermet materials in the hardfacing. By maintaining the tube rod in this preferred location in a longer than usual flame, eta phase and oxide particle formation in the matrix is minimized. In the welding practice according to this embodiment of the invention, the formation of oxide and eta phase particles is insensitive to increases in heat input of the flame, unlike conventional welding practices in which oxide and eta phase particle formation increases with increases in heat input from the flame. In addition, the particle size of the eta phase and oxide particles is greatly refined to less than 30 μm.

The length of the intermediate cone relative to the inner cone, and the neutral condition of the flame are readily adjusted by varying the pressure or flow rate of the oxygen and acetylene to the torch. This can be accomplished by pressure regulators at the tanks and/or adjustment of the valves on the torch.

A preferred region for the welding rod in a torch flame having 3:1 ratio of cone lengths is between about one and two cm from inner flame cone tip; however it is difficult to maintain the tube rod in this small range during manual welding. Hence, this is a less preferred method of hard facing. The longer than usual flame with a 4:1 ratio provides a much longer zone within which the welding rod may be placed for achieving a low eta phase and oxide concentration in the matrix of the hardfacing.

The eta phase and oxide content in the matrix may be determined by polishing a cross-section of a tooth with hardfacing with incrementally decreasing sizes of diamond particles from 40 μm to 3 μm. The polished surface is then etched with a reagent of 10 g KFe(CN)$_6$, 10 g KOH and 100 ml water followed by an alcohol rinse. The eta phase and oxide content may be determined using a PGI Imagist image analyzer at 100× magnification.

The proportion of carbide in the hardfacing is determined largely by the proportion in the welding "rod" used for applying the hardfacing. Some dilution may occur by alloy steel from the surface of the tooth on the cutter cone. This dilution is not a large contributor since in a typical application of hardfacing to a milled tooth cutter cone for a rock bit, the thickness of hardfacing is in the order 2 mm. The amount of dilution depends to some extent on the technique employed by the welder applying the hardfacing.

The carbide content in the hardfacing can be estimated by metallographic examination of a cross section through the hardfacing. The approximate areas of the carbide and binder phases can be determined. From this, the volume percentages of binder and carbide can be estimated, and in turn the weight percentages. Since use of deoxidizer in the filler of a welding tube is important for producing void free binder phase, the dilution of the carbide filler can be taken into account and the ratio of filler weight to tube weight approximated. A hypothetical tube type welding rod can be projected from a hardfacing deposited on the surface by other techniques.

Thus, for consistency in this specification, the proportion of carbide to alloy steel in the hardfacing is considered on the basis of carbide content in the stick used to melt the hardfacing onto the surface. As pointed out above, the filler of carbide, binder and deoxidizer is 50% to 80% by weight (plus or minus 2%) of the stick and the mild steel tube is 20% to 50% by weight (plus or minus 2%). The filler is about 96% carbide (plus or minus 2%), with a balance of deoxidizer and binder.

The improved hardfacing material is applied to the gage surfaces of the cone and gage row teeth in the same manner previously described for applying the hardfacing mixture to the inner row teeth.

Abrasion tests show that the improved hardfacing materials of this invention exhibit improved wear and fracture resistance over hardfacing materials containing similar proportions of carbide particles but which do not include spherical cast carbide particles. For example, in a hardfacing comprising a carbide component with 70 percent by weight of 16 to 30 mesh crushed cemented carbide and 30 percent by weight of 40 to 80 mesh macrocrystalline carbide, it has been found that by substituting 40 percent by weight of the crushed cemented carbide particles with spherical cast carbide particles in the same size range, loss of hardfacing material due to sliding abrasion wear, chipping, and carbide particle fracture were significantly reduced. It is hypothesized that this improved performance is due to the advantages of both the material and geometry of the spherical cast tungsten carbide particles over the crushed cemented tungsten carbide particles they replace. Cast carbide is inherently harder than cemented carbide and hence is more resistant to abrasion wear. Also, it is believed that the spherical particles are less likely to fracture during actual field use than the crushed particles because although cast tungsten carbide is not inherently tougher than cemented tungsten carbide, the spherical particles lack the sharp edges of the crushed particles which act as stress concentrators and hence are more prone to fracture and breakage.

The improvement in performance of the hardfacing translates directly into increased footage of well drilled and increased rate of penetration, both of which translate directly into lowered costs for the driller.

Other modifications and variations of hardfacing for a rock bit will be apparent to one skilled in the art. It is, therefore, to be understood that within the scope of the appended claims, this invention may be practiced otherwise than as specifically described.

What is claimed is:

1. A rock bit comprising:
   a body;
   at least one cutting cone rotatably mounted to an end of the body, wherein the cone includes a gage surface at a heel portion of the cone;
   a number of teeth on the cone, the teeth including a plurality of inner row teeth and a plurality of gage row teeth located near a heel of each cone, wherein the teeth include a hardfacing comprising:
   steel in the range of from 20 to 50 percent by weight; and
   filler in the range of from 50 to 80 percent by weight, the filler comprising in the range of from 10 to 100 percent by weight spherical cast tungsten carbide particles having a particle size between about 16 to 40 mesh.

2. The rock bit of claim 1 comprising filler in the range of from 60 to 75 percent by weight.

3. The rock bit of claim 1 wherein the filler comprises in the range of from 20 to 50 percent by weight spherical cast tungsten carbide particles.

4. The rock bit of claim 1 wherein the filler comprises in the range of from 40 to 100 percent by weight spherical cast tungsten carbide particles.

5. The rock bit of claim 1 wherein the filler comprises in the range of from 10 to 99 percent by weight spherical cast tungsten carbide particles having a particle size between about 16 to 40 mesh, and further comprises tungsten carbide particles selected from the group consisting of spherical cemented, crushed cemented, crushed cast, crushed macrocrystalline, and carburized.

6. The rock bit of claim 5 wherein the filler further comprises spherical cast tungsten carbide particles having a particle size between about 80 to 200 mesh.

7. The rock bit of claim 6 wherein the filler comprises spherical cast tungsten carbide particles having a particle size between about 100 to 200 mesh.

8. The rock bit of claim 5 wherein the filler further comprises macrocrystalline tungsten carbide particles having a particle size between about 40 to 80 mesh.

9. A rock bit as recited in claim 1 wherein the hardfacing comprises in the range of from 10 to 90 percent by weight spherical cast tungsten carbide particles having a particle size between about 16 to 40 mesh, and further comprises ultra-fine tungsten carbide particles in the range of from 10 to 35 percent by weight of the filler material, the particles having a particle size in the range of from about 1 to 50 microns.

10. A rock bit as recited in claim 9 wherein the ultra-fine tungsten carbide particles are selected from the group consisting of carburized, macrocrystalline, and spherical cast.

11. A rock bit as recited in claim 9 wherein the steel in the hardfacing is dispersion strengthened by the ultra-fine tungsten carbide particles.

12. A rock bit comprising:

a body;

at least one cutting cone rotatably mounted to an end of the body, wherein the cone includes a gage surface at a heel portion of the cone;

a number of teeth on the cone, the teeth including a plurality of inner row teeth and a plurality of gage row teeth located near a heel of each cone, wherein the teeth include a hardfacing comprising:

steel in the range of from 20 to 50 percent by weight;

filler in the range of from 50 to 80 percent by weight, the filler comprising in the range of from 10 to 100 percent by weight spherical cast tungsten carbide particles having a particle size between about 80 to 200 mesh.

13. The rock bit of claim 12 comprising filler in the range of from 60 to 75 percent by weight.

14. The rock bit of claim 12 wherein the filler comprises in the range of from 20 to 50 percent by weight spherical cast tungsten carbide particles.

15. The rock bit of claim 12 wherein the filler comprises in the range of from 40 to 100 percent by weight spherical cast tungsten carbide particles.

16. The rock bit of claim 12 wherein the filler comprises spherical cast tungsten carbide particles having a particle size between about 100 to 200 mesh.

17. The rock bit of claim 12 wherein the filler comprises in the range of from 10 to 99 percent by weight spherical cast tungsten carbide particles having a particle size between about 80 to 200 mesh, and further comprises spherical cast tungsten carbide particles having a particle size between about 16 to 40 mesh.

18. The rock bit of claim 12 wherein the filler comprises in the range of from 10 to 99 percent by weight spherical cast tungsten carbide particles having a particle size between about 80 to 200 mesh, and further comprises tungsten carbide particles selected from the group including spherical cemented, crushed cemented, crushed cast, and crushed macrocrystalline.

19. The rock bit of claim 18 wherein the filler further comprises macrocrystalline tungsten carbide particles having a particle size between about 40 to 80 mesh.

20. A rock bit as recited in claim 12 wherein the hardfacing comprises in the range of from 10 to 90 percent by weight spherical cast tungsten carbide particles having a particle size between about 80 to 200 mesh, and further comprises ultra-fine tungsten carbide particles in the range of from 10 to 35 percent by weight of the filler material, the particles having a particle size in the range of from about 1 to 50 microns.

21. A rock bit as recited in claim 20 wherein the ultra-fine tungsten carbide particles are selected from the group consisting of carburized, macrocrystalline, and spherical cast.

22. A rock bit as recited in claim 20 wherein the steel in the hardfacing is dispersion strengthened by the ultra-fine tungsten carbide particles.

23. A rock bit comprising:

a body;

at least one cutting cone rotatably mounted to an end of the body, wherein the cone includes a gage surface at a heel portion of the cone;

a number of teeth on the cone, the teeth including a plurality of inner row teeth and a plurality of gage row teeth located near a heel of each cone, wherein the teeth include a hardfacing comprising:

steel in the range of from 20 to 50 percent by weight;

filler in the range of from 50 to 80 percent by weight, the filler comprising in the range of from 10 to 100 percent by weight spherical cast tungsten carbide particles having a particle size between about 16 to 40 mesh and between about 80 to 200 mesh.

24. A rock bit as recited in claim 23 wherein the hardfacing comprises in the range of from 10 to 90 percent by weight spherical cast tungsten carbide particles having a particle size between about 16 and 40 mesh and between about 80 to 200 mesh, and further comprises ultra-fine tungsten carbide particles in the range of from 10 to 40 percent by weight of the filler material, the particles having a particle size in the range of from about 1 to 50 microns.

25. A rock bit as recited in claim 24 wherein the ultra-fine tungsten carbide particles are selected from the group consisting of carburized, macrocrystalline, and spherical cast.

26. A rock bit as recited in claim 24 wherein the steel in the hardfacing is dispersion strengthened by the ultra-fine tungsten carbide particles.

27. The rock bit of claim 23 wherein the filler comprises spherical cast tungsten carbide particles having a particle size between about 100 to 200 mesh.

* * * * *